(12) United States Patent
Baker et al.

(10) Patent No.: US 6,671,372 B1
(45) Date of Patent: Dec. 30, 2003

(54) PRINTED WIRING BOARD CABLE COVER

(75) Inventors: Frank P. Baker, Chatham, NJ (US); Theodore A. Conorich, Parsippany Township, NJ (US); William J. Ivan, Woodbridge, NJ (US); Michael G. German, Secaucus, NJ (US); Golam M. Choudhury, Somerset, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/329,444

(22) Filed: Jun. 10, 1999

(51) Int. Cl.[7] .......................... H04M 1/00; H04M 9/00; H04M 9/08
(52) U.S. Cl. .............. 379/399.01; 379/413.03; 379/413.04; 379/417
(58) Field of Search .............. 379/399.01–413.04, 379/441–442, 415–417

(56) References Cited

U.S. PATENT DOCUMENTS 4,242,721 A * 12/1980 Krolak et al.
4,882,647 A * 11/1989 Collins
5,495,524 A * 2/1996 Gunell
5,718,604 A   2/1998 Conorich et al.
6,078,661 A * 6/2000 Arnett et al.

* cited by examiner

Primary Examiner—Duc Nguyen
(74) Attorney, Agent, or Firm—Birch, Stewart, Kolasch & Birch, LLP

(57) ABSTRACT

A protective cable cover separates cable routing from patch-cords and cross-connect wire in a wiring trough, and includes a printed wiring board that provides a means for mounting electronic circuitry and components. The cable cover is placed over the cable conductors on a wiring block cable organizer. A circuit designation strip and row marking pads are provided to designate rows and circuit connections. A strike engages a latch on a patchcord plug to releasably retain the plug in engagement with the wiring block. Mounting holes are formed integral with the cable cover to engage latches on the cable organizer for releasably mounting the cable cover on the cable organizer.

20 Claims, 5 Drawing Sheets

PRINTED WIRING BOARD CABLE COVER

CROSS REFERENCE TO RELATED APPLICATIONS

This application is related to copending application Ser. No. 09/329,573 entitled "Twenty Eight Pair Cabling System" filed on Jun. 10, 1999, copending application Ser. No. 09/330,120 entitled "Cable Cover" filed on Jun. 10, 1999, and copending application Ser. No. 09/329,438 entitled "Cable Organizer With Conductor Termination Array" filed on Jun. 10, 1999.

FIELD OF THE INVENTION

This invention relates to the field of telecommunications, and more particularly to connectors for use in telecommunication system cabling.

BACKGROUND OF THE INVENTION

The telecommunications and data management industries utilize connective hardware for general building wiring, premises distribution systems, local area networks, and other network applications. The connective hardware known as the 110 Connector Systems has become a standard of the industry because of the reliable gas-tight connection provided by the 110 Insulation Displacement Connector. This miniature quick-connect terminating system is listed or approved by Underwriters Laboratories, the Canadian Standards Association, and the Australian Standards Association. The 110 Connector Systems have gained type approval from such countries as the United Kingdom, Japan, Korea, and others.

The 110 Connector System consists of field-wired cable termination apparatus that is used to organize and administer cable and wiring installations. The main cross-connect is typically located in the equipment room and provides termination and cross-connection of network interface equipment, switching equipment, processor equipment, and backbone (riser or campus) wiring. The horizontal cross-connect is typically located in the telecommunications closet and provides termination and cross-connection of horizontal (to the work area) and backbone wiring. Cross-connects provide efficient and convenient routing and rerouting of common equipment circuits to various parts of a building or campus.

The 110 Connector Systems enable cable and wiring installations to be handled by technical or non-technical end user personnel. Line moves and rearrangement for the cabling termined at a cross connect can be performed with patchcords (plug-ended jumpers) or cross-connect wire. The patchcords are used where the highest system integrity is required.

Referring now to FIGS. 1, 2, and 3, the prior art 110 Connector System 10 was designed to have its connector ports 15 arranged in horizontal rows in uniformly spaced conductor termination arrays (index strips). FIG. 1 shows four rows of index strips 14 mounted in a typical wiring block 12. The spaces between these index strips become troughs, and are alternately dedicated as either cable routing troughs 16 or cross-connect wire routing troughs 18.

Unsheathed cable conductors 20 are routed through the cable troughs 16 to their appropriate termination ports in the index strips 14. All cable sheaths stop at the entrance to the cable troughs 16. Each cable trough 16 feeds conductors to the two index strips that form its sides.

Connecting blocks 22, each containing several contact elements 24 in pairs, are placed over the index strips 14 and make electrical connections to the cable conductors 20. These connecting blocks 22 also form the side walls of the troughs 16 and 18. A designation strip 26 is placed within the cable trough 16, near the top of the connecting blocks 22. This strip 26 extends the full length of the cable trough 16, covering the cable conductors 20, and allows the cable connector ports 15 to be visibly labeled as an indication of where the other end of the cables are attached. A pair of row marking surfaces 27 are provided to label each row.

Cross-connect wire (not shown) or patch cords 28 are terminated in the ports 25 on the top of the connecting blocks 22. Cross-connect wires, when used, are routed to their appropriate ports 25 through the cross-connect troughs 18 between the cable troughs 16. The connecting blocks 22 form the separator between cable conductors 20 and cross-connect conductors. When patch cords 28 are used, the cross-connect troughs 18 remain empty.

The 110 patchcords 28 are available now in two versions. The old version is a forward-engaging patchcord 28 that uses a forward-engaging plug 30 as shown in FIG. 1. The patchcord 28 projects outward from the connecting block 22, is routed through ducts 32, backboards 34, and troughs 36 to another connecting block 22, as shown in FIG. 3.

The new version patchcord uses a reverse-engaging plug. The new patchcord is further described in U.S. Pat. No. 5,718,604 entitled Patch Cord Connection System issued on Feb. 17, 1998 and is incorporated herein by reference.

SUMMARY OF THE INVENTION

In accordance with the present invention, there is provided a printed wiring board cable cover, for use in connection with a cable organizer, cable conductors, a connecting block, and a patchcord plug. The printed wiring board cable cover comprises a cover front surface and an opposite cover rear surface. The front and rear surfaces extend between opposite upper and lower edges, and between opposite first and second ends. The rear surface is juxtaposed with the cable organizer to protect the cable conductors. A printed wiring board extends across at least part of the front and rear surfaces, for mounting electronic circuitry and components. Mounting means is provided for releasably mounting the printed wiring board cable cover on the cable organizer.

BRIEF DESCRIPTION OF THE DRAWING

A more complete understanding of the present invention may be obtained from consideration of the following description in conjunction with the drawing, in which.

DESCRIPTION OF THE PREFERRED EMBODIMENTS

Figure 1:
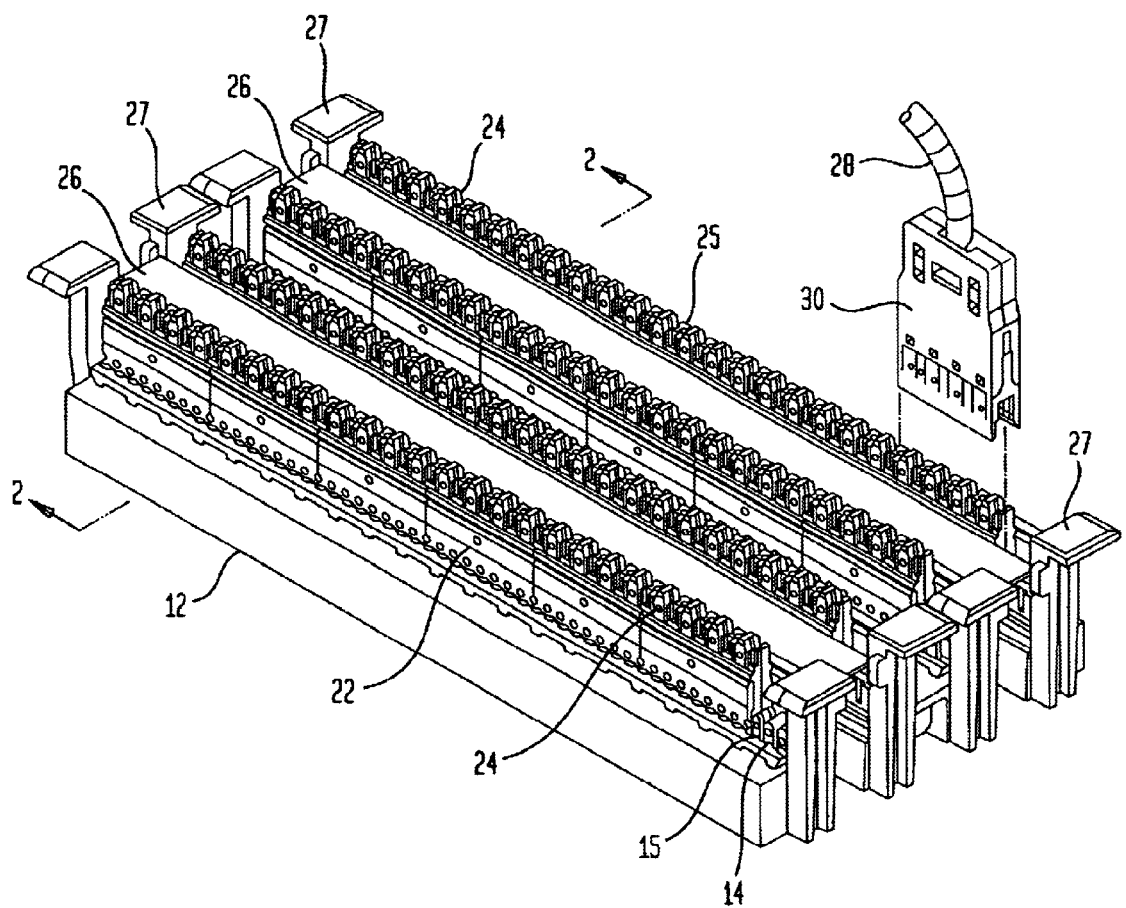
FIG. 1 is a perspective view of a prior art wiring block, including connection blocks and a forward-engaging patchcord plug.
Figure 2:
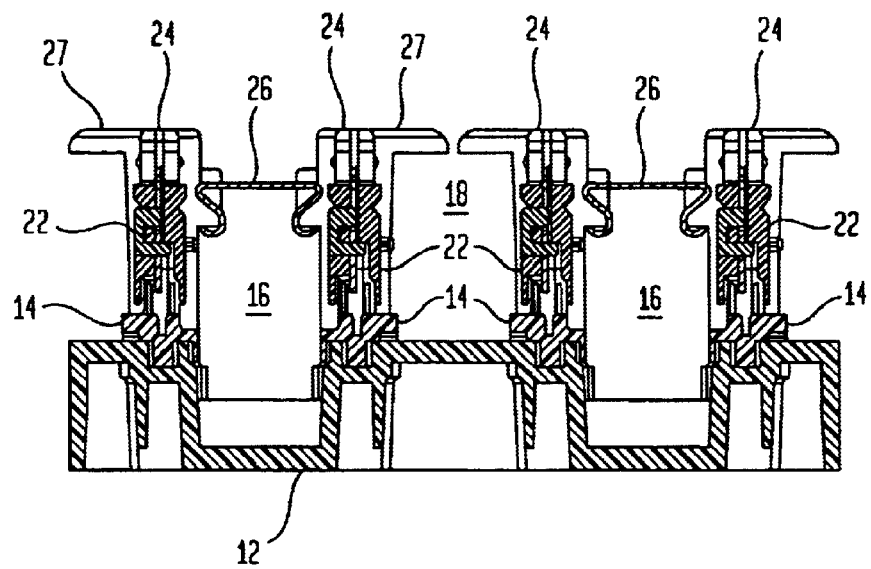
FIG. 2 is a cross-sectional view of the prior art wiring block of FIG. 1, taken along lines 2—2 of FIG. 1.
Figure 3:
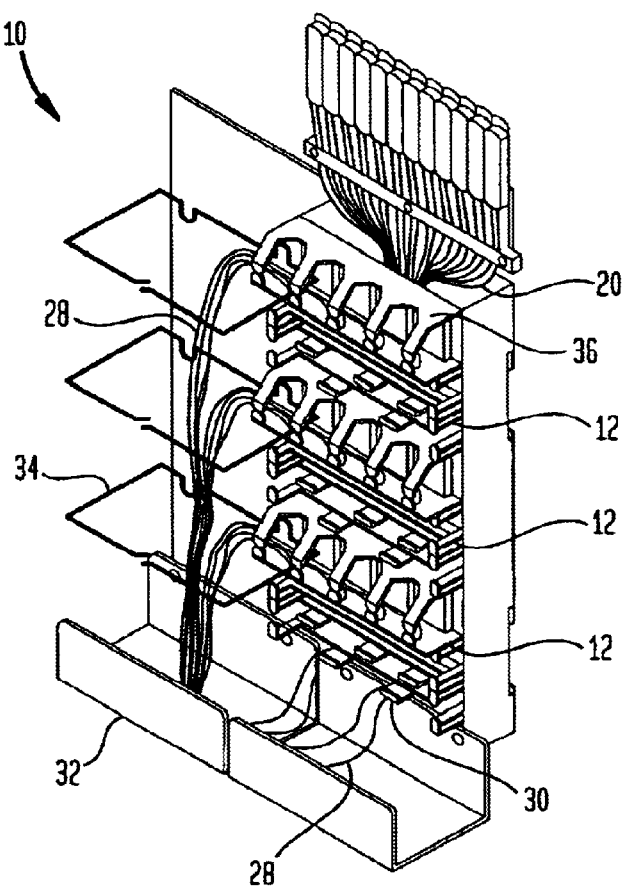
FIG. 3 is a perspective view of a prior art 110 Connector System, showing the prior art wiring block, patchcords and troughs.
Figure 4:
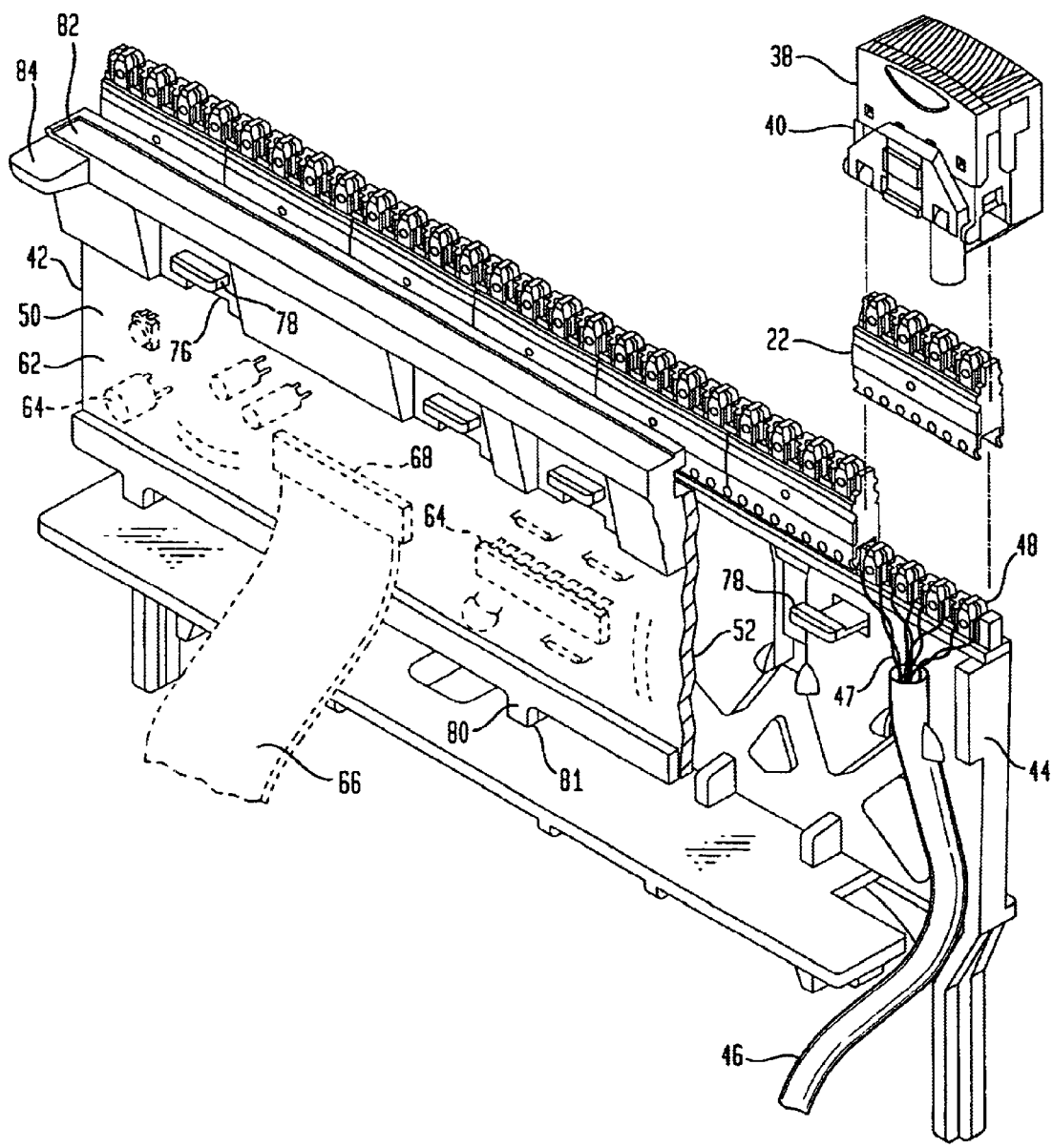
FIG. 4 is a perspective view of a printed wiring board cable cover constructed in accordance with the invention showing a cable organizer, a conductor termination array, connecting blocks, a cable conductor and a patchcord plug in a partially exploded assembly.
Figure 5:
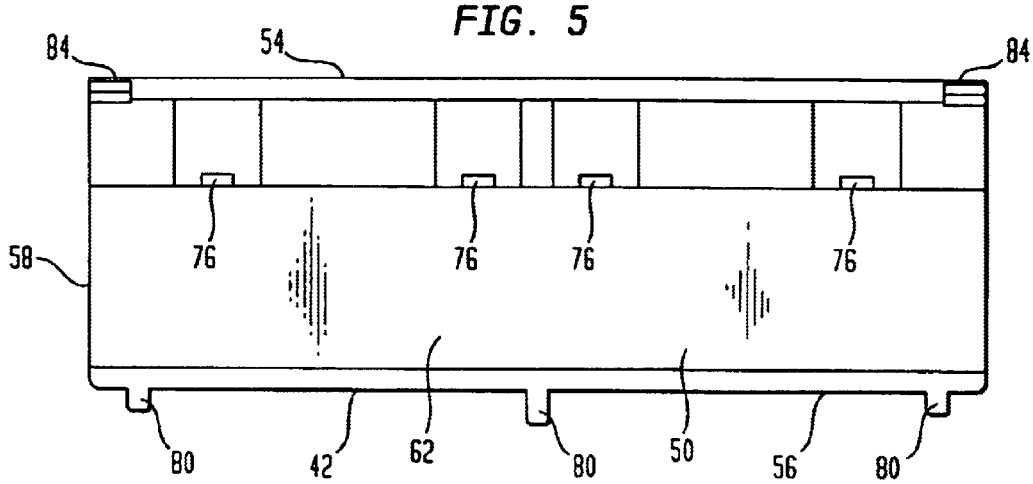
FIG. 5 is a front elevational view of the cable cover of FIG. 4.
Figure 6:
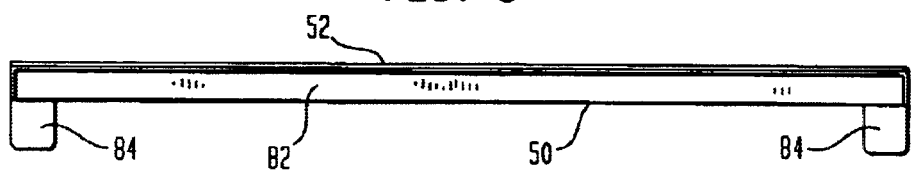
FIG. 6 is a top plan view of the cable cover of FIG. 4.
Figure 7:
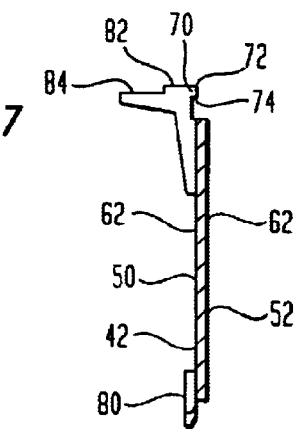
FIG. 7 is a side elevational view of the cable cover of FIG. 4.
Figure 8:
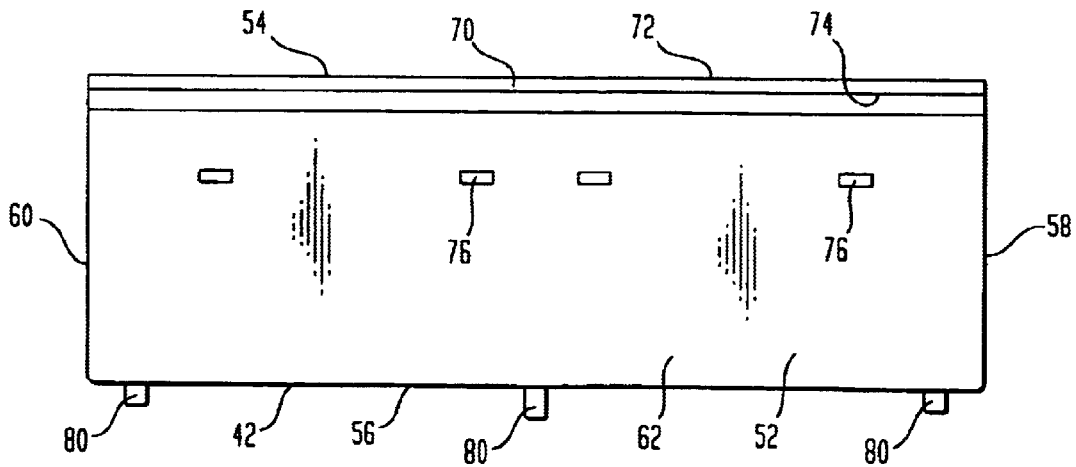
FIG. 8 is a rear elevational view of the cable organizer of FIG. 4.
Figure 9:
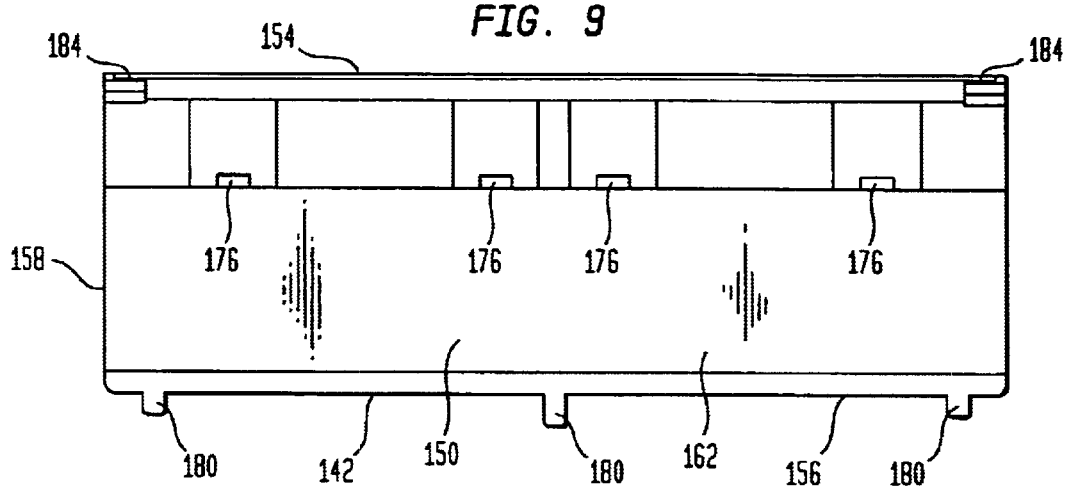
FIG. 9 is a front elevational view of another printed wiring board cable cover constructed in accordance with the invention.
Figure 10:
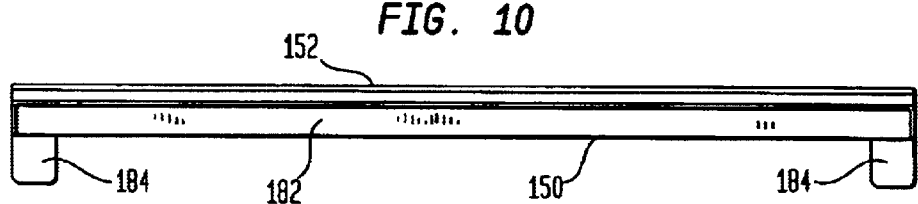
FIG. 10 is a top plan view of the cable cover of FIG. 9.
Figure 11:
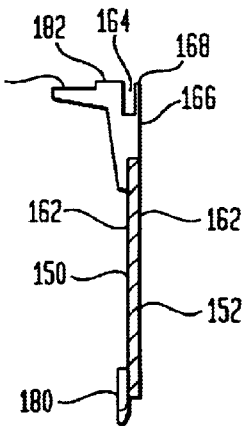
FIG. 11 is a side elevational view of the cable cover of FIG. 9.
Figure 12:
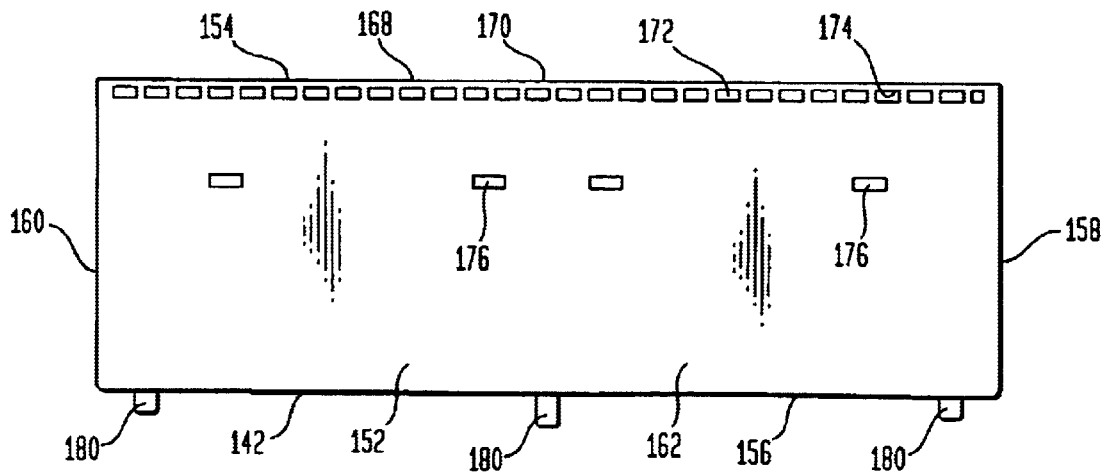
FIG. 12 is a rear elevational view of the cable cover of FIG. 9.

The new version patchcord 38 uses a reverse-engaging plug 40 as shown in FIG. 4. The new patchcord 38 projects inward. Every trough potentially carries three types of conductor: patchcords 38, cable conductors 20, and cross-connect conductors. Consequently, the troughs are crowded, making the patch cord conductors difficult to trace. The crowding of unsheathed cable conductors can result in cross-talk and other electrical problems, and, the new patchcord 38 can snag on wiring while being pulled out. In order to partly address these problems, the wiring block has index strips that are elevated upon a cable organizer and set wider apart to enlarge the troughs. However, the new cable organizer has no designation strips or row marking surfaces. Channels direct the cable conductors across the cable organizer front surface toward the termination array.

The cable conductors are sheathed up to the termination array, helping to organize the cable conductors, reduce cross-talk, and improve electrical performance. Cross-talk could, however be further reduced through electronic circuitry, as well as by the provision of a common ground for the shielded cables. Electrical protection should also be provided within the transmission circuit, and a means for incorporating some intelligence in cross-connect tracing is desirable.

Referring now to the drawings, and especially to FIGS. 4, 5, 6, 7, and 8, a printed wiring board cable cover 42 is used in connection with a cable organizer 44, cable conductors 47, a connecting block 22, and a patchcord plug 40. A conductor termination array 48 is mounted upon the cable organizer 44. The printed wiring board cable cover 42 comprises a cover front surface 50 and an opposite cover rear surface 52, the front 50 and rear 52 surfaces extending between opposite upper 54 and lower 56 edges, and between opposite first 58 and second 60 ends. The rear surface 52 is juxtaposed with the cable organizer 44 to protect the sheathed cable 46 and cable conductors 47.

A printed wiring board 62 extends across at least part of the front 50 and rear 52 surfaces, and provides a means for mounting electronic circuitry and components 64. The circuitry and components 64 shown in FIG. 4 are for illustration only, and represent no particular circuit. For intelligent cross-connect, the printed wiring board 62 is connected by a ribbon cable 66 and connector 68 to external power and controls (not shown). For protection, a ground bus is connected to the printed wiring board. The connector 68 may alternatively be located at the back edge of the printed wiring board 62.

The circuitry and components 64 can provide cross-talk compensation, electrical protection, a common ground for shielded cables, as well as a vehicle for incorporating intelligence in cross-connect tracing.

Patchcord retaining means is provided for retaining the patchcord plug 40 in engagement with the connecting block 22. Specifically, a patchcord strike 70 projects transversely outward from the cable cover rear surface 52 adjacent the cable cover upper edge 54. The patchcord strike 70 has front 72 and rear 74 faces disposed transversely to the cable cover rear surface 52. Thus, the front 72 and rear 74 faces will engage a latch on the patchcord plug 40 to releasably retain the patchcord plug 40 in engagement with the connecting block 22.

Mounting means is provided for releasably mounting the printed wiring board cable cover 42 on the cable organizer 44. Typically, at least one, and preferably several, holes defining mounting strikes 76 are formed integral with the cable cover 42. The mounting strikes 76 engage with latches 78 on the cable organizer 44. At least one, and preferably several, fingers 80 project outward from the cable cover 42, for engagement with corresponding recesses 81 in the cable organizer 44.

Recording means is provided for recording indicia on the cable cover 42 to designate rows and circuit connections. Specifically, a circuit designation strip 82 is disposed along the cable cover upper edge 54. At least one, and preferably two row marking pads 84 are disposed on the cable cover upper edge 54.

Turning now to FIGS. 9, 10, 11, and 12, as well as FIG. 4, a second embodiment of the cable cover is disclosed, and is very similar to the above-described invention. A printed wiring board cable cover 142 is used in connection with a cable organizer 44, cables 46, a connecting block 22, and a second patchcord plug (not shown, but similar to plug 40). The cable cover 142 comprises a cover front surface 150 and an opposite cover rear surface 152, the front 150 and rear 152 surfaces extending between opposite upper 154 and lower 156 edges, and between opposite first 158 and second 160 ends. The rear surface 152 is juxtaposed with the cable organizer 44 to protect the sheathed cable 46 and cable conductors 47.

A printed wiring board 162 extends across at least part of the front 150 and rear 152 surfaces, and provides a means for mounting electronic circuitry and components 64.

Recording means is provided for recording indicia on the cable cover 142 to designate rows and circuit connections. Specifically, a circuit designation strip 182 is disposed along the cable cover upper edge 154. At least one, and preferably two row marking pads 184 are disposed on the cable cover upper edge 154.

Patchcord retaining means is provided for retaining the patchcord plug in engagement with the connecting block 22. Specifically, a patchcord strike 164 has a proximal edge 166 attached to the cable cover rear surface 152 adjacent the cable cover upper edge 154. The patchcord strike 164 projects outward to a distal edge 168 defining a front face 170. The patchcord strike 164 extends between the cable cover first 158 and second 160 ends, and is disposed generally parallel to the cable cover rear surface 152. The patchcord strike 164 has a plurality of holes 172 therethrough spaced apart between the cable cover first 158 and second 160 ends. The holes 172 have edges defining a rear face 174, so that the front 170 and rear 174 faces will engage a latch on the patchcord plug to releasably retain the patchcord plug in engagement with the connecting block 22.

Mounting means is provided for releasably mounting the cable cover 142 on the cable organizer 44. Typically, at least one, and preferably several, holes defining mounting strikes 176 are formed integral with the cable cover 142. The mounting strikes 176 engage with latches 78 on the cable organizer 44. At least one, and preferably several, fingers 180 project outward from the cable cover 142, for engagement with corresponding recesses 81 in the cable organizer 44.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which will come within the scope of the appended claims is reserved.

What is claimed:

1. A printed wiring board cable cover, for use in connection with a cable organizer and cable conductors, the printed wiring board cable cover comprising:

a cover front surface and an opposite cover rear surface, the front and rear surfaces extending between opposite upper and lower edges, and between opposite first and second ends, the rear surface being juxtaposed with the cable organizer to protect the cable conductors;

a printed wiring board extending across at least part of the front and rear surfaces, for mounting electronic circuitry and components;

mounting features for releasably mounting the printed wiring board cable cover on the cable organizer; and a patchcord retainer attached to said printed wiring board cable cover for retaining a patchcord plug in engagement with the cable organizer.

2. The cable cover of claim 1, further comprising:

indicia receiving surfaces formed on the cable cover for recording indicia to designate rows and circuit connections.

3. The cable cover of claim 2, wherein the indicia receiving surfaces include:

a circuit designation strip disposed along the cable cover upper edge; and at least one row marking pad disposed on the cable cover upper edge.

4. The cable cover of claim 1, wherein the patchcord retainer includes a patchcord strike projecting transversely outward from the cable cover rear surface adjacent the cable cover upper edge, the patchcord strike having a rear face disposed transversely to the cable cover rear surface for engagement with a latch on the patchcord plug.

5. The cable cover of claim 1, wherein the patchcord retainer includes a patchcord strike projecting outward from and generally parallel to the cable cover rear surface adjacent the cable cover upper edge, the patchcord strike having a plurality of spaced apart holes therethrough, the holes having edges defining a rear face for engagement with a latch on the patchcord plug.

6. The cable cover of claim 1, wherein the mounting features comprises at least one mounting strike integral with the cable cover for engagement with a latch on the cable organizer.

7. The cable cover of claim 1, wherein the printed wiring board contains electronic circuitry and components to provide cross-talk compensation for the cable conductors.

8. The cable cover of claim 1, wherein the printed wiring board contains electronic circuitry and components for monitoring a cross-connect system of the cable conductors.

9. The cable cover of claim 1, wherein the printed wiring board provides a common ground for shielded cables containing the cable conductors.

10. The cable cover of claim 1, wherein the patchcord retainer includes a patchcord strike projecting transversely outward from the cable cover rear surface adjacent the cable cover upper edge, the patchcord strike having front and rear faces disposed transversely to the cable cover rear surface, so that the front and rear faces will engage a latch on the patchcord plug to releasably retain the patchcord plug in engagement with the cable organizer.

11. The cable cover of claim 1, wherein the patchcord retainer includes a patchcord strike projecting outward from a proximal edge attached to the cable cover rear surface adjacent the cable cover upper edge to a distal edge defining a front face, the patchcord strike extending between the cable cover first and second ends, the patchcord strike being disposed generally parallel to the cable cover rear surface, the patchcord strike having a plurality of holes therethrough spaced apart between the cable cover first and second ends, the holes having edges defining a rear face, so that the front and rear faces will engage a latch on the patchcord plug to releasably retain the patchcord plug in engagement with the cable organizer.

12. The cable cover of claim 1, wherein the mounting features comprise:

at least one mounting strike integral with the cable cover for engagement with a latch on the cable organizer; and at least one finger projecting outward from the cable cover, for engagement with a corresponding recess in the cable organizer.

13. A printed wiring board cable cover, for use in connection with a cable organizer and cable conductors, the printed wiring board cable cover comprising:

a cover front surface and an opposite cover rear surface, the front and rear surfaces extending between opposite upper and lower edges, and between opposite first and second ends, the rear surface being juxtaposed with the cable organizer to protect the cable conductors;

a printed wiring board extending across at least part of the front and rear surfaces, for mounting electronic circuitry and components; and mounting means for releasably mounting the printed wiring board cable cover on the cable organizer, wherein the printed wiring board contains electronic circuitry and components to provide cross-talk compensation for the cable conductors.

14. The cable cover of claim 13, further comprising:

patchcord retaining means for retaining a patchcord plug in engagement with the cable organizer; and recording means for recording indicia on the cable cover to designate rows and circuit connections.

15. A printed wiring board cable cover, for use in connection with a cable organizer and cable conductors, the printed wiring board cable cover comprising:

a cover front surface and an opposite cover rear surface, the front and rear surfaces extending between opposite upper and lower edges, and between opposite first and second ends, the rear surface being juxtaposed with the cable organizer to protect the cable conductors; and a printed wiring board extending across at least part of the front and rear surfaces, for mounting electronic circuitry and components, wherein the printed wiring board contains electronic circuitry and components to provide cross-talk compensation for the cable conductors.

16. The cable cover of claim 15, further comprising:

indicia receiving surfaces formed on the cable cover for recording indicia to designate rows and circuit connections.

17. The cable cover of claim 16, wherein the indicia receiving surfaces include:
   a circuit designation strip disposed along the cable cover upper edge; and
   at least one row marking pad disposed on the cable cover upper edge.

18. The cable cover of claim 15, further comprising a patchcord retainer attached to said printed wiring board cable cover for retaining a patchcord plug in engagement with the cable organizer.

19. The cable cover of claim 18, wherein the patchcord retainer includes a patchcord strike projecting transversely outward from the cable cover rear surface adjacent the cable cover upper edge, the patchcord strike having a rear face disposed transversely to the cable cover rear surface for engagement with a latch on the patchcord plug.

20. The cable cover of claim 18, wherein the patchcord retainer includes a patchcord strike projecting outward from and generally parallel to the cable cover rear surface adjacent the cable cover upper edge, the patchcord strike having a plurality of spaced apart holes therethrough, the holes having edges defining a rear face for engagement with a latch on the patchcord plug.

* * * * *